Jan. 12, 1943.    P. W. STEPHENS    2,308,320
PRESSURE COOKER
Filed Feb. 14, 1940    2 Sheets-Sheet 1

Inventor:
Percy W. Stephens,

Jan. 12, 1943. P. W. STEPHENS 2,308,320
PRESSURE COOKER
Filed Feb. 14, 1941 2 Sheets-Sheet 2
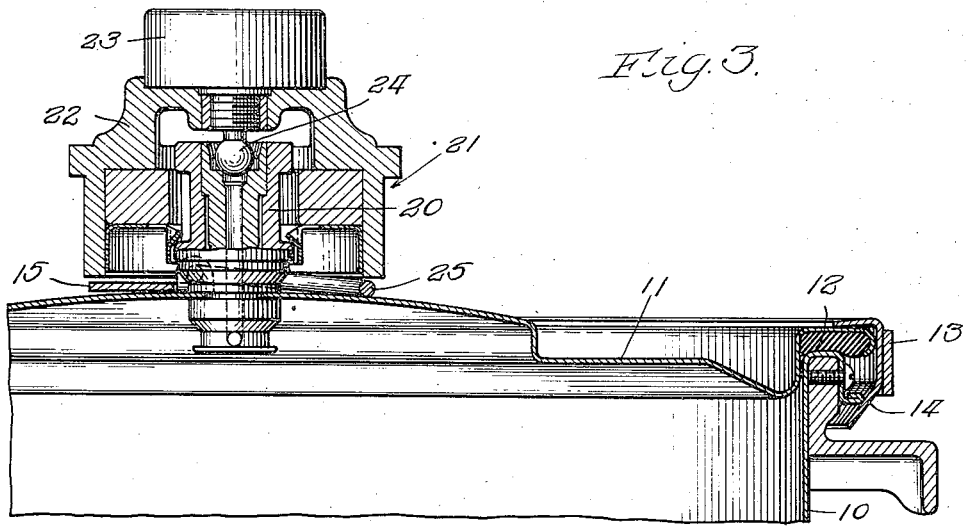
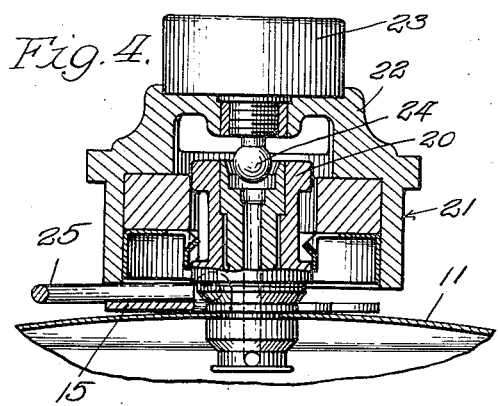
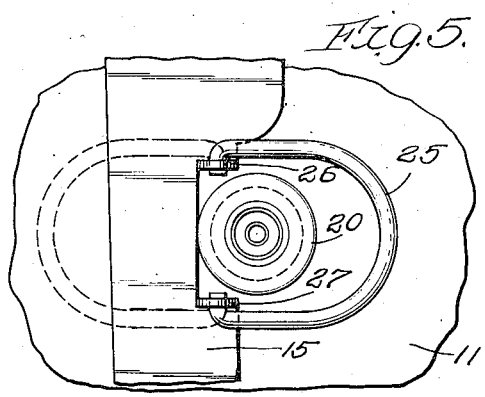
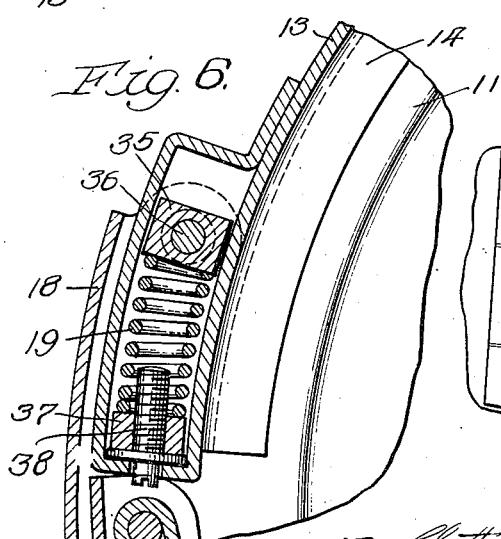
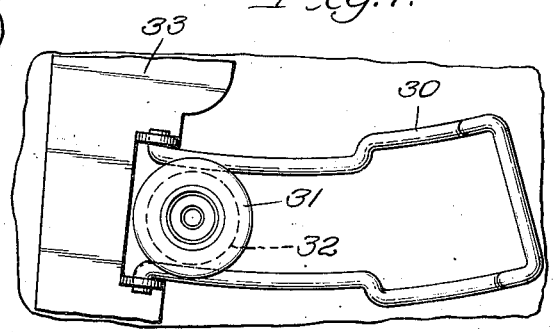
Inventor:
Percy W. Stephens,
By Chritton, Wiles, Davies, Hinckel & Bacon, Attys.

Patented Jan. 12, 1943

2,308,320

UNITED STATES PATENT OFFICE 2,308,320

PRESSURE COOKER

Percy W. Stephens, Oak Park, Ill.

Application February 14, 1940, Serial No. 318,952

9 Claims. (Cl. 220—61)

This invention relates to a pressure cooker, and more particularly to improved clamping actuating and locking means for effecting and maintaining a seal between a cover and a container.

This application is a continuation-in-part of my application, Serial No. 89,189, filed July 6, 1936, which issued Feb. 27, 1940, as Patent Number 2,191,975; and discloses improvements in devices of the character shown in my Patent 2,133,060, which issued October 11, 1938.

Figure 1:
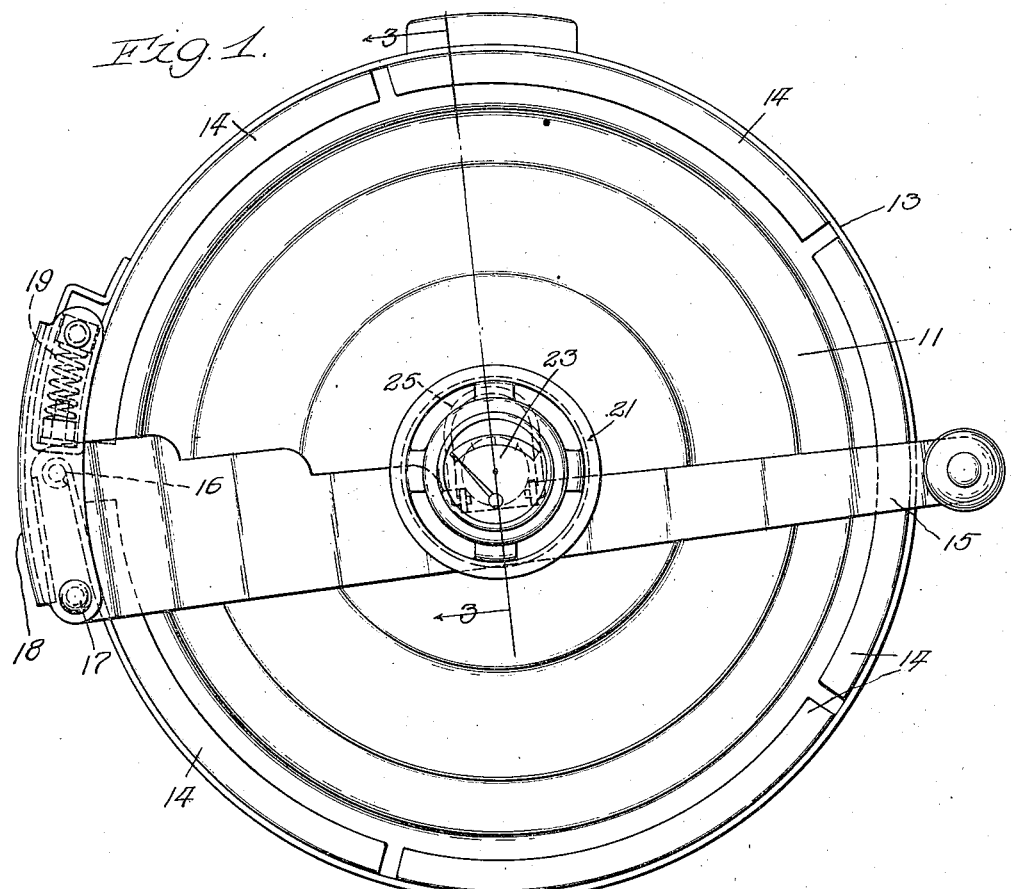
Figure 2:
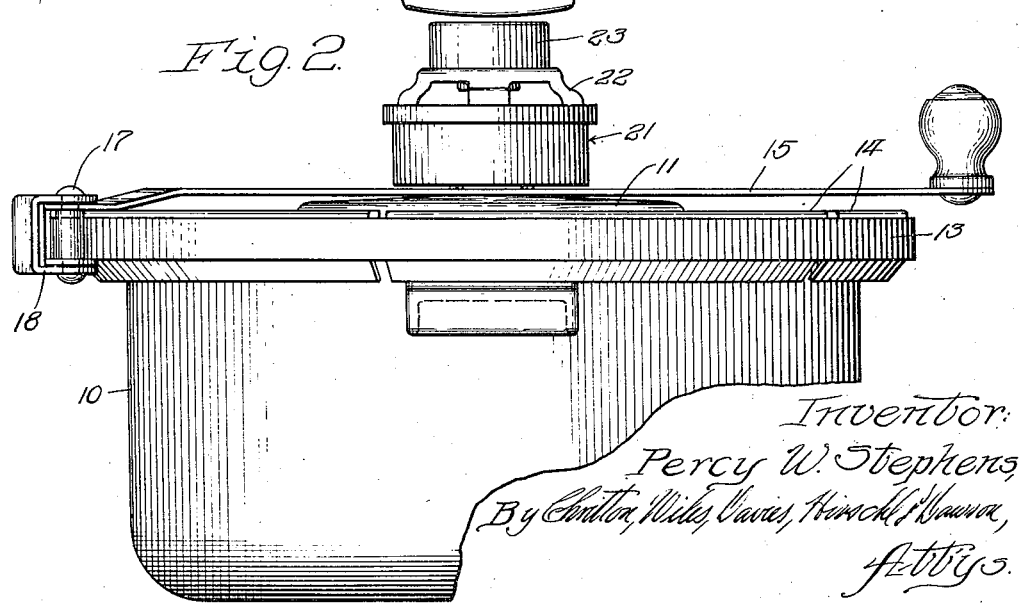

One feature of this invention is that it provides improved means for locking actuating and clamping means in clamped position; another feature of this invention is that the means for clamping and holding the cover to the body portion of a pressure cooker cannot be fully released until pressure existing in the cooker has been vented and released to atmosphere; yet another feature of this invention is that if the actuating means is placed in clamping position pressure cannot be raised in the cooker until it is locked in such position; a further feature of this invention is the provision of means for compensating for shrinkage and compression of the gasket between the cover and body portion of the cooker; other features and advantages of this invention will be apparent from the following specification and the drawings, in which:

Figure 1 is a top plan view of a pressure cooker embodying my invention; Figure 2 is a partial side elevation of the cooker shown in Figure 1; Figure 3 is a partial vertical sectional view along the line 3—3 of Figure 1, showing the actuating means locked in clamping position; Figure 4 is a partial vertical sectional view showing the actuating means in clamping position, but the locking means in open or unlocked position; Figure 5 is a fragmentary top plan view particularly concerned with the details of the locking arrangement; Figure 6 is a fragmentary detail horizontal sectional view particularly showing the means for adjusting the tension of the spring interposed between a portion of the actuating means and a portion of the clamping means; and Figure 7 is a partial top plan view of the center of the cooker, particularly directed to a modified form of locking means.

Pressure cookers of the type designed and intended for domestic use must not only achieve the desired function of raising and maintaining pressure during cooking, but should be so constructed and arranged as to be fool-proof in operation. That is, the arrangement should be such that it is impossible to release the cover from the cooker while there is still pressure in the cooker, even by a person who has never theretofore handled the cooker and who is not following instructions for its proper use. Moreover, means should be provided for compensating for any compression or deformation of the sealing gasket between the cover and body portion of the cooker, resulting from normal usage.

The cooker here shown and described is in general respects similar to those shown in my above-mentioned patents. I have, however, achieved the desirable objects mentioned in the preceding paragraph by adding locking means for locking the actuating lever for the clamping means in clamping position, so arranged that pressure cannot be raised in the cooker until the locking means is in locked position, and this means cannot be unlocked until pressure has been released. I have also provided means for compensating for wear of the gasket by adding to my cooker means for adjusting the tension of the spring interposed between a portion of the actuating means and a portion of the clamping means, and through which sealing pressure is applied.

In the particular embodiment of my invention illustrated in Figures 1 to 6, the body portion of the cooker comprises a pot or container 10, and this is adapted to have a cover 11, provided with an annular gasket 12, sealed thereto by clamping means. The clamping means is here shown as a closure band comprising a strip 13 of spring metal and a plurality of arcuate segments 14 attached thereto, each such segment having upper and lower inwardly extending flanges, at least one of these flanges, here shown as the bottom flange, diverging considerably from the plane of the closure band. As may be best seen in Figure 3, and as has heretofore been more fully described in my above identified patents, contraction of the effective diameter of the closure band clamps the cover tightly to the upper edge of the body portion 10 of the cooker to effect a pressure-tight seal therebetween.

Actuating means for positively varying the effective diameter of the closure band is in the form of a manually operable lever 15 pivotally connected at one point, as by the pin 16, to one end of the band, and at another spaced point, as by the pin 17, to one end of a link 18. The other end of the link is operatively connected, in a manner which will hereinafter be more fully described, through a coil spring 19 to the other end of the closure band. When the lever 15 is in the position shown in the drawings clamping or actuating pressure is applied through the spring 19, to effect the desired seal between the cover and body portion of the cooker. When the lever 15 is swung open (downwardly and to the left, speaking with respect to Figure 1) the lever and link have a toggle action which spreads the ends of the band apart to increase the diameter of the closure band and release the cover from the cooker, so that it and the band may be completely removed therefrom.

Valve means is provided in the center of the cover. This is here shown as comprising a vertical tube 20 extending through the center of the cover and projecting upwardly therefrom; and a weight-held safety valve and pressure indicating unit 21 adapted to be carried by the tube. The unit 21 includes as its principal parts a main body portion 22, a pressure gage 23, and a valve member 24, this latter being a hard metal ball adapted to rest on the top of the tube to close the tube and to carry the weight of the unit. A small opening is drilled through the center of the ball connecting with the pressure indicating mechanism in the gage 23.

Means for locking the lever 15 in clamping position is provided in the form of a bail or loop of wire 25, pivotally mounted at its ends in upwardly projecting tabs or ears 26 and 27 on the lever 15. The dimensions of this bail, as may be best seen in Figure 5, are large enough that when the lever is in clamping position as shown the bail can be swung back and forth over the top of the tube 20. That is, the bail can be swung from unlocked position, shown in dotted lines in Figure 5, to locked position encircling the tube, shown in full lines in such figure. The dimensions of the bail are small enough, however, that it cannot be swung back and forth when the valve assembly 21 is in place on the tube.

When the cooker is being used the desired contents would be placed in the container, the cover laid thereon (without the valve assembly), the band placed around the edge of the cover and container, and the lever swung to clamping position, as shown in the drawings. The bail would then be swung over the tube into locked position. After these steps have been completed the fire would be started under the cooker to drive out air and generate steam therein, and as soon as steam started to issue from the tube 20 the valve assembly 21 would be placed thereon to close the opening. The cooker would then be in the condition shown in Figure 3, in which it would remain during the cooking process. After cooking was completed the fact that the bail 25 encircles the tube 20 would prevent any inadvertent swinging of the lever 15 to open or unclamped position before removing the valve assembly 21 and venting the pressure in the cooker.

In order to insure against failure to lock the apparatus in clamped position before raising pressure in the cooker, the mounting arrangement of the bail on the lever 15 is such that when the lever 15 is in clamping position, but the bail is in unlocked position, the valve assembly is prevented from dropping down to properly seated position on the top of the tube 20. This may be best seen in Figure 4, where it will be noted that the left hand edge of the valve body is kept up above its proper position by the bail 25 to such an extent that the valve member 24 does not close the opening through the center of the tube 20.

A modified form of locking arrangement is shown in Figure 7. In this modification the bail 30 is provided with an enlarged end portion of sufficient dimension to pass any part of the central vertical tube 31. The bail also includes, however, a long relatively narrow shank portion. This shank portion has such a width between its two arms as will enable it to enclose or lie on each side of a portion of reduced extremity in the tube, the annular groove or reduced portion being indicated by the dotted line 32. When the locking means is in locked position, as shown in Figure 7, the bail cannot be swung up over the tube 31; it is first necessary to move the actuating lever 33 to the left, away from fully closed position, until the tube lies in the enlarged end portion of the bail; then the bail can be lifted up over the tube to unlock the lever. The length of the shank is so proportioned that movement of the lever from fully closed position to a position where the tube lies in the enlarged end of the bail is sufficient to just barely break the seal between the cover and the body portion of the cooker, but not sufficient to fully release the cover. In this modification the housewife first pulls the lever as far as it will come, thus automatically breaking the seal and permitting relatively slow release of steam around the edge of the cover, without any danger of the cover blowing off or of the contents spilling out; and then the valve is removed, the bail swung up, and opening of the cooker completed.

In order to secure the best sealing effect, the gasket 12 must, of course, be of some resilient material; and continued pressure of the type taking place each time the cover is clamped to the body portion of the cooker finally results in such compression of this gasket as to require more than the original contraction of the closure band. It will be noted, speaking now particularly with respect to Figure 6, that one end of the band is turned back on itself to form a socket receiving the coil spring 19. The link 18 has top and bottom flange portions completing the socket effect, and in this socket is slidably mounted a block 35. The end of the link 18 is pivotally connected to the block 35, as by the pin 36, and the toggle action caused by swinging the lever 15 into clamping position first brings the ends of the band closer together, and then, when sufficient resistance to further movement is effected by tight engagement between the cover and the top of the container 10, the block 35 moves downwardly (speaking with respect to the position of the parts shown in Figure 6) to compress the spring 19. The amount of pressure clamping the cover and container together is, therefore, a function of the final tension in the spring 19; and the spring thus automatically serves to take up some of the slack caused by compression of the gasket. In order to provide the original sealing pressure even when the gasket has become compressed, however, I here employ means for adjusting the tension in the spring 19 under circumstances where it would otherwise have decreased to less than its original tension when the lever is in clamping position.

This adjusting means is here shown as comprising a second block 37 slidably but non-rotatably splined in the socket, and a stud 38 threaded therethrough. Counter-clockwise rotation of the stud 38, as by the use of a screw driver in the notched projecting end when the band and clamping means are open, moves the block upwardly so as to adjust the tension in the spring 19 to its original value even when the parts have loosened so that the block 35 is further up in the socket.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus for sealing the cover to the body portion of a pressure cooker having a tube carrying a pressure release valve, including: means for clamping the cover to the body portion of the cooker; means for actuating the clamping means; and a member movably mounted on the actuating means and adapted to engage the tube to lock the actuating means in clamping position, said locking member being so constructed and arranged as to be capable of being unlocked only when the valve is open.

2. Apparatus for sealing the cover to the body portion of a pressure cooker having a vertical tube mounted on and projecting above the cover for carrying a readily removable pressure release valve, including: means for clamping the cover to the body portion of the cooker; toggle and lever means for actuating the clamping means, the lever being so arranged, when in clamping position, as to have a portion thereof adjacent the tube; and a bail pivotally mounted on the lever and adapted to be swung over the tube when the lever is in clamping position.

3. Apparatus of the character claimed in claim 2, wherein the dimensions of the bail are such that it can be swung over the tube only when the valve is removed therefrom.

4. Apparatus of the character claimed in claim 2, wherein the bail is so mounted on the lever as to prevent placing the valve in closed position on the tube when the lever is in clamped position without the bail being in locking position encircling the tube.

5. Apparatus for sealing the cover to the body portion of a pressure cooker having a pressure release valve, including: means for clamping the cover to the body portion of the cooker; means for actuating the clamping means; and means for locking the actuating means in clamping position, the locking means being so constructed and arranged that when it is in unlocked position and the actuating means is in clamping position the locking means lies in the path of movement between open and closed positions of at least a portion of the valve and prevents closure of the valve and raising of pressure in the cooker.

6. Apparatus of the character claimed in claim 5, wherein the locking means cannot be moved from locked to unlocked position, after the valve has been closed, until the valve is opened.

7. Apparatus of the character claimed in claim 2, wherein the tube has a reduced portion and the bail has a large end portion and a smaller shank portion closely fitting the reduced portion of the tube.

8. Apparatus for sealing the cover to the body portion of a pressure cooker, including: a closure band for clamping the cover to the body portion of the cooker; actuating means for positively varying the effective diameter of the band; and means for locking the actuating means against complete opening while permitting substantial movement thereof, initial movement of the actuating means serving to break the seal between the cover and body portion of the cooker, but another and different movement of one of the means being necessary to fully release the cover.

9. Apparatus for sealing the cover to the body portion of a pressure cooker having a tube element carrying a pressure release valve, including: means for clamping the cover to the body portion of the cooker; means for actuating the clamping means, including a lever element adapted, when in clamping position, to have a portion thereof adjacent the tube element; and a bail pivotally mounted on the lever and adapted, when the lever is adjacent the tube, to be swung over the tube to encircle it and lock the lever in clamping position, the bail being of such size as to be capable of being swung over the tube only when the valve is open.

PERCY W. STEPHENS.